United States Patent

[11] 3,536,137

| [72] | Inventor | Herbert C. Walther<br>Ponca City, Oklahoma |
|------|----------|---------------------------------------------|
| [21] | Appl. No. | 432,875 |
| [22] | Filed | Feb. 15, 1965<br>Division of Ser. No. 200,310,<br>June 6, 1962, now Patent<br>No. 3,282,238 |
| [45] | Patented | Oct. 27, 1970 |
| [73] | Assignee | Continental Oil Company<br>Ponca City, Oklahoma<br>a corporation of Delaware |

[54] USE OF A COUPLING AGENT IN CONSOLIDATING INCOMPETENT SUBTERRANEAN FORMATIONS WITH A RESINOUS COMPOSITION
15 Claims, No Drawings

[52] U.S. Cl. ..................................................... 166/295

[51] Int. Cl. ...................................................... E21b 33/13
[50] Field of Search ............................................ 166/295,
300; 260/38

[56] References Cited
UNITED STATES PATENTS
3,297,086  1/1967  Spain............................. 166/295

*Primary Examiner*—Stephen J. Novosad
*Attorneys*—David P. Cullen, Joseph C. Katarski, Henry H. Huth, Jerry B. Peterson and Harold M. Dixon ABSTRACT: A method of consolidating incompetent subterranean formations by injecting therein a settable resinous composition wherein there is also injected a Werner complex-type coupling agent to increase the bond strength between the subterranean formation and the resinous composition.

USE OF A COUPLING AGENT IN CONSOLIDATING INCOMPETENT SUBTERRANEAN FORMATIONS WITH A RESINOUS COMPOSITION

This is a divisional application of the copending application entitled "Method for Consolidating Material," Ser. No. 200,310, filed June 6, 1962, now U.S. Pat. No. 3,282,338.

This invention relates to a method of consolidating loose or incompetent subterranean formations. More particularly, the invention relates to improvements in methods for consolidating incompetent, subterranean formations, which methods employ a resinous composition as a consolidating agent.

In the production of subterranean fluids, such as oil, gas, water, etc., a number of difficulties are encountered when the well by which the fluids are produced penetrates a loose or unconsolidated subterranean formation. Such formations frequently are composed of loose water or oil sands, and the grains of the sand become entrained in the fluid being produced to be carried into the well bore. The result of such entrainment, among other things, is the abrasion of the pumping equipment in the well bore, the clogging of strainers, and the sanding in of the cavity immediately adjacent the strainer. These results in turn ultimately cause a sharp decrease in the rate of production and high maintenance costs.

In an effort to reduce the deleterious results generally associated with producing fluids from an unconsolidated formation, it has heretofore been proposed to inject an age-hardenable cementing agent into the producing formation adjacent the well bore in order to consolidate or make rigid the formation. The cementing agent directly contacts the loose grains or particles in the formation and, by bonding them to each other, reduces their mobility.

One of the cementing agents widely used in such previous processes, and also in the instant process, is a resin-forming composition containing formaldehyde, phenol, and a suitable catalyst. In one consolidating method, this composition, in liquid form, is pumped down the well bore and into the formation where it sets up to a hardened state upon standing. A variety of means is employed for flushing the excess resin from the formation so that the permeability of the formation is retained.

As evidenced by the substantial number of relatively recent innovations and modifications which have been developed in the basic phenol-formaldehyde resin process, this method of formation consolidation does not as yet afford an entirely satisfactory solution to the difficulties associated with unconsolidated formations. One of the problems which has not been solved to the most desirable degree is that of obtaining a strong or tenacious bond between the resinous material and the particles of sand or other particulate materials in the formation. As a result, effective consolidation is often not achieved.

One of the efforts to improve the tenacity of the bond which is established between the formation particles and the resin is described in U.S. Pats. No. 2,378,817 and No. 2,604,172 to Gilbert G. Wrightsman, which consists primarily of introducing into the formation an agent capable of rendering the formation particles wettable by the resin-forming liquid. Although a substantial improvement in the uniformity and tenacity of the bond which is established between the resin and formation particles results from the use of this technique, the strength of such bond is still far lower than optimum.

One aspect of the present invention concerns a novel and practical method for consolidating loose or incompetent formations of the type described, which results in a strong, tenacious bond between a resinous material which is pumped into and set up in the formation, and the grains of material composing the formation.

By the use of the invention, the compressive or crushing strength of consolidated siliceous materials may be greatly enhanced as compared to the crushing strength obtainable by employing any of the phenol-formaldehyde consolidation methods heretofore in use. Moreover, the method of the invention does not result in any serious reduction in formation permeability.

In one of its broader aspects, the invention resides in the use of certain types of chemical compounds to chemically couple, or bond, age-hardenable resin molecules to impart great rigidity and strength to the consolidated formation.

In general, the coupling agents which are employed have a molecular structure which is (a) characterized by having a first functional group located at an exposed position in the molecule for reacting with the resinous material which is used for consolidating the formation, and (b) is further characterized in having a second functional group, or an atom, located at a second exposed location in the molecule for establishing a chemical bond with the granular material of the formation. The coupling agent thus provides a strong chemical bridge linking the molecules of the consolidating resinous materials to the grains of material in the formation.

Coupling agents of the general type described include, but are not limited to, Werner-type coordination compounds consisting of transition metal salt complexes of alpha, beta unsaturated acyclic carboxylic acids, particularly the cobalt, chromium, zinc, and nickel complexes, and organo-functional silanes, such as $\gamma$-aminopropyltriethoxysilane, and $\delta$-aminobutylmethyldiethoxysilane. Other specific examples of these and other types of suitable compounds will appear hereinafter.

In one method of practicing the process of the present invention, the formation to be consolidated is first isolated by means well-known in the art, such as, by packers. A quantity of diesel oil or other inert hydrocarbon material, such as distillate or crude oil, is then injected into the formation to flush out the formation and cleanse the formation particles. A solution or mixture containing the coupling agent is next injected into the formation, followed by the injection of a liquid to remove excess coupling agent. Then follows a resin treatment which comprises the steps of injecting a volume of a resin mixture into the formation, removing the excess plastic material from the interstices between the formation particles by flushing with an inert flushing material, and finally shutting in the well to maintain a static condition within the formation for a sufficient period of time to permit the plastic to set up to a hardened state.

While the above brief description presents a preferred method of practicing the invention, certain deviations in this process may be made without departing from the spirit of the invention. For example, the coupling agent may be added directly to the resin mixture in one alternative, or the coupling agent may be incorporated into the overflush and placed in the formation after the resin has been injected, as a second alternative.

By the described process, the state of formation consolidation is vastly improved in that a more rigid, tenaciously interconnected structure is formed without decrease in formation porosity to a detrimental degree. The crushing strength of the consolidated formation materials is generally increased by a factor of at least five, and the permeability of the formation is ordinarily decreased by not more than 35 percent, and usually substantially less.

From the foregoing description, it will be apparent that it is a major object of the present invention to improve presently used processes of consolidating incompetent formations wherein an age-hardenable plastic or resinous material is injected into the loose formation to harden.

It is a more specific object of the invention to improve the methods now in use for rendering competent, loose or unconsolidated formations from which a fluid is being produced, which methods utilize a phenol-formaldehyde resin as the consolidating material. The basic principle underlying the invention may, however, be employed when other types of organic resins, such as urea, melamine, polyester, and acrylic, are used.

Another object of the invention is to increase the permanency and degree of consolidation effected by artificial means in a porous, fluid-producing formation.

A further object of the present invention is to impart a higher crushing or compressive strength to an artificially consolidated subterranean formation than has heretofore been possible using methods previously known.

Another object of the invention is to improve the strength and durability of the porous skeletal structure of an artificially consolidated subterranean formation without seriously decreasing the permeability of the formation.

Another object of the invention is to provide an improved practical process for consolidating incompetent subterranean formations, which process is sufficiently simple in nature to permit it to be practiced relying largely upon consolidating techniques heretofore known and appreciated.

A further object of this invention is to provide a practical process for consolidating incompetent subterranean formations wherein an amount of overflush is not critical.

A more specific object of the present invention is to provide an improved process for consolidating incompetent subterranean formations using a partially polymerized resin mixture.

Other objects and advantages of the invention will become apparent as the following detailed description of the invention is read.

Before describing in greater detail one series of steps entailed in the process of the invention, the coupling agents which are employed in practicing the process and the mechanism by which they act in forming a chemical bridge between the siliceous material in the formation and the consolidating resinous material will be discussed. Typically, such coupling agents will comprise molecules having a group or atom which is capable of reacting with, or being strongly held by, the formation sands and having a reactive organic group which orients outwardly from the sand and is capable of combining with the consolidating materials. Molecular species of this general type include Werner complex-type compounds in which the multivalent transition metals, preferably chromium, cobalt, nickel, copper, lead, and zinc, are coordinated with a carboxylic acido group; vinyl-trichlorosilanes; and certain aminoalkylethoxysilanes. Preferred in the latter group of compounds are those in which at least one of the alkyl substituents of the silicon atom is at least three carbon atoms in chain length so that the amino group which is attached to the terminal carbon atom of such alkyl group is located no closer to the silicon atom than the gamma position. γ-, δ-, and ε-aminoalkylethoxysilanes are also satisfactory as are higher homologues of these materials having extended alkyl chains attached to the silicon atoms, with the amino group bound to the terminal carbon atom of such extended alkyl chains.

Of the Werner complexes employed, those containing an alpha, beta unsaturated acyclic carboxylic acido group containing from two to six carbon atoms in the aliphatic chain, such as acrylic acido and substituted acrylic acido groups, are preferred. Among other acid types which may be used are sorbic acid, crotonic acid, propionic acid, vinyl acetic acid, allyl acetic acid, oleic acid, maleic acid, and adipic acid. Chromium and cobalt are the preferred metals of the complex.

In addition to and in some cases complementary with the above general discussion of the characteristics of coupling agents which may be used in the present invention, a number of types of chemical structural formulas have been recognized as being suitable for use in the process. In many of the following structural examples, the symbol "X" will appear and will be identified as an anion. For further clarification, which need not be repeated in each of the individual examples, it should be stated that any anion is contemplated by "X." Generally, however, Br⁻, Cl⁻, F⁻, I⁻, (NO₃)⁻, and (ClO₄)⁻ are preferred. For convenience and reference, these structural-type formulas will be set forth hereinafter in numbered order. Water bound in the coordination shell is not shown.

1. 1,2-diamines and transition metal ions.

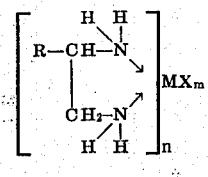

wherein:

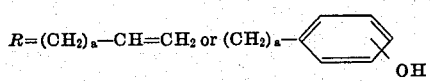

(a = 0–5)
$X$ = an anion
$M$ = Ni$^{II}$, Cu$^{II}$, Zn$^{II}$, Cd$^{II}$, Cr$^{III}$ or Co$^{III}$
$n$ = 1 or 2
$m$ = 2 or 3

The following specific structural example of 3,4-diaminobutene-1-tetraaquocobalt (III) chloride is typical of compounds of this type:

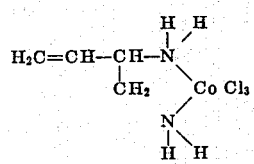

Diaquobis (p-hydroxyphenylethylenediamine) chromium (III) perchlorate and bis(3,4-diaminobutene-1)diaquochromium (III) chloride are further examples of compounds which typify this group of coupling agents.

2. Substituted salicylaldehydes and transition metal ions.

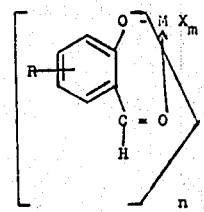

wherein:

$R$ = —NH$_2$ or —OH or —(CH$_{2b_a}$)—CH=CH$_2$
(a = 0–5)
$M$ = Mn$^{II}$, Fe$^{II}$, Co$^{II}$, Ni$^{II}$, Cu$^{II}$, Zn$^{II}$, Cd$^{II}$, Pb$^{II}$, Cr$^{III}$ or Co$^{III}$
$n$ = 1 or 2
$m$ = 1 or 2

The following specific structural example of bis (2,4-dihydroxybenzaldehydato) diaquochromium (III) chloride is typical of compounds of this type:

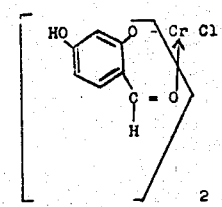

Bis (2-hydroxy-4-aminobenzaldehydato) diaquochromium (III) chloride; 2,4-dihydroxybenzaldehydatotetraaquocobalt (III) perchlorate; and 2-hydroxy-4-aminobenzaldehydeatodiaquonickel (II) nitrate are further examples of compounds which typify this group of coupling agents.

3. β-diketones and transition metal ions.

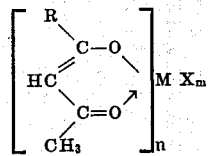

and

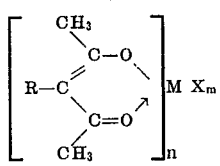

wherein:
$R = -(CH_2)_a - -OH$, or $(CH_2)_a - CH=CH_2$, or $-(CH_2)_b - NH_2$
($a = 0-5$, $b = 1-5$)
$X = $ an anion
$M = Mn^{II}$, $Fe^{II}$, $Co^{II}$, $Ni^{II}$, $Cu^{II}$, $Zn^{II}$, $Cd^{II}$, $Co^{III}$, $Mn^{III}$ or $Cr^{III}$
$n = 1$ or $2$
$m = 1$ or $2$ The following specific structural example of bis(6-heptene-2,4-dionato)diaquochromium (III) nitrate is typical of compounds of this type:

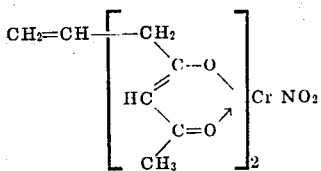

The following specific structural example of 3-aminomethyl-2,4-pentanedionatodiaquonickel (II) chloride is typical of compounds of this type:

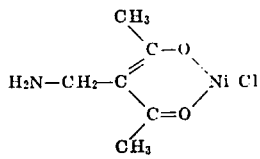

Bis(3-hydroxyphenyl-2,4-pentanedionato)diaquocobalt (III) chloride; bis(1-hydroxyphenyl-2,4-pentanedionato)diaquochromium (III) nitrate; and 1-hydroxyphenyl-2,4-pentanedionatotetraaquochromium (III) nitrate are further examples of compounds which typify these groups of coupling agents.

4. α-aminocarboxylic acids and transition metal ions.

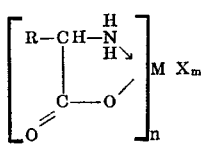

wherein:
$R = -(CH_2)_a - CH=CH_2$, or $-(CH_2)_a -$ ⟨phenyl⟩ $-OH$, or $-(CH_2)_b - NH_2$
($a = 0-5$, $b = 1-5$)
$X = $ an anion
$M = Mn^{II}$, $Fe^{II}$, $Co^{II}$, $Ni^{II}$, $Cu^{II}$, $Zn^{II}$, $Cd^{II}$, $Co^{III}$ or $Cr^{III}$
$m = 1$ or $2$
$n = 1$ or $2$ The following specific structural example of bis(tyrosinato)diaquochromium (III) nitrate is typical of compounds of this type:

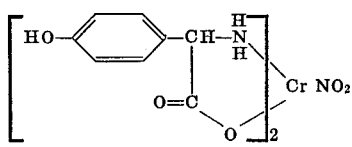

Bis(lysinato)diaquocobalt (III) chloride; tyrosinatotetraaquochromium (III) chloride; and tyrosinatodiaquocopper (II) nitrate are further examples of compounds which typify this group of coupling agents.

5. α-hydroxycarboxylic acids and transition metal ions.

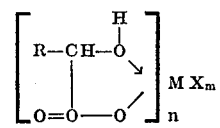

wherein:
$R = (CH_2)_a -$ ⟨phenyl⟩ $-OH$, or $(CH_2)_a - CH=CH_2$, or $(CH_2)_b - NH_2$
($a = 0-5$, $b = 1-5$)
$X = $ an anion
$M = Mn^{II}$, $Fe^{II}$, $Co^{II}$, $Ni^{II}$, $Cu^{II}$, $Zn^{II}$, $Cd^{II}$, $Co^{III}$, $Cr^{III}$ or $Zr^{IV}$
$n = 1$ or $2$
$m = 1-3$ The following specific structural example of p-hydroxyphenyllactatodiaquonickel (II) chloride is typical of compounds of this type:

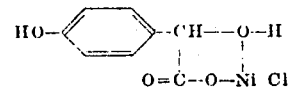

p-hydroxyphenyllactatotetraaquochromium (III) chloride and α-hydroxy-β-aminopropionatodiaquocopper (II) nitrate are further examples of compounds which typify this group of coupling agents.

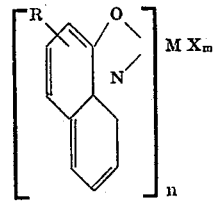

wherein:
$R = -OH$, or $-(CH_2)_a NH_2$, or $-(CH_2)_a - CH=CH_2$
($a = 0-5$)
$X = $ an anion
$M = Co^{II}$, $Ni^{II}$, $Cu^{II}$, $Zn^{II}$, $Cr^{III}$ or $Co^{III}$
$m = 1$ or $2$
$n = 1$ or $2$ The following specific structural example of bis(6-hydroxy-8-quinolinolato)diaquocobalt (III) chloride is typical of compounds of this type:

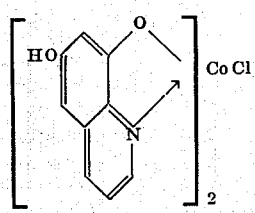

Bis(6-amino-8-quinolinolatoadiaquochromium (III) chloride; bis(5-amino-8-quinolinolatodiaquochromium (III) chloride; and 5-vinyl-8-quinolinolatodiaquonickel (II) nitrate are further examples of compounds which typify this group of coupling agents.

7. Schiff bases of salicylaldehyde and transition metal ions.

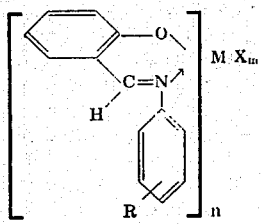

wherein:

$R = -OH$ or $-(CH_2)_a-NH_2$ or $(CH_2)_a-CH=CH_2$
$(a=1-5)$
$X$ = an anion
$M = Cu^{II}, Ni^{II}, Co^{II}, Fe^{II}, Zn^{II}, Cr^{III}$ or $Co^{III}$ The following specific structural example of salicylaldehyde-p-aminophenyliminatodiaquocopper (II) nitrate is typical of compounds of this type:

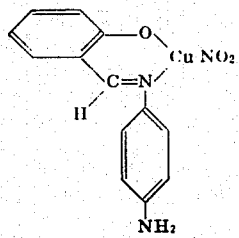

Bis(salicylaldehyde-p-hydroxyphenyliminatodiaquochromium (III) chloride and salicylaldehyde-m-aminomethylphenyliminatotetraaquocobalt (III) perchlorate are further examples of compounds which typify this group of coupling agents.

8. Silyl ethers with functional groups which will bond to the plastic.

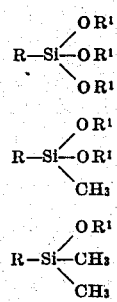

wherein:

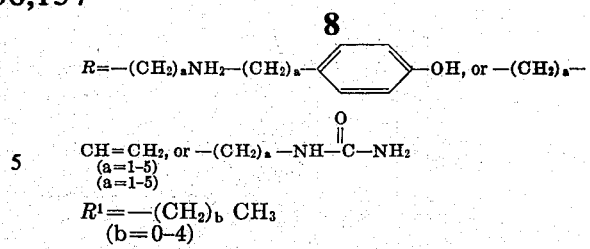

$R^1 = -(CH_2)_b CH_3$
$(b=0-4)$

The following specific structural example of α-aminopropyltriethoxysilane is typical of compounds of this type:

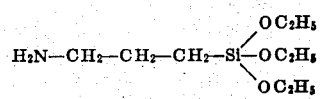

Methyl-β-aminoethyldimethoxysilane and dimethyl-β-(p-hydroxyphenyl)ethylethoxysilane are further examples of compounds which typify this group of coupling agents.

As illustrative of the manner in which a typical coupling agent of the Werner complex-type functions, the use of one of the preferred agents, methacrylatochromic chloride, in bonding phenolic resins to silicious material may be cited. This particular coupling agent is represented by the formula:

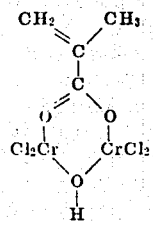

The chromium complex establishes a chemical bond through the chromium atoms with the negatively charged siliceous surfaces of the formation particles. A chemical bond may then be formed between the methacrylato group and the methylene groups of the phenol-formaldehyde resin. The chemical bridge formed may thus be portrayed schematically:

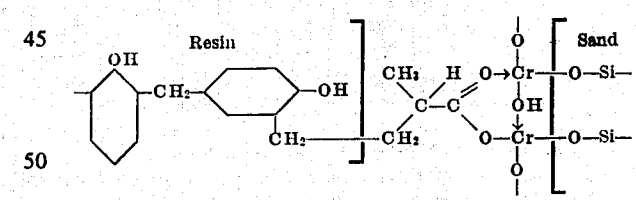

The aminoalkylethoxysilanes which may be used as coupling agents also establish chemical bridges interlinking the molecules of the resinous consolidating material and the siliceous formation materials. Thus, γ-aminopropyltriethoxysilane, which is a preferred composition in this process, reacts with the aldehydic group of the phenol-formaldehyde resinous composition to form a γ-azomethinepropyltriethoxysilane, and the silicon atom of the silanol group bonds through oxygen to the silicon atoms of the formation material.

Turning now to a description of one method of practicing the process of the present invention, the initial step performed is the preparation of the formation for the injection thereinto of one of the above-described coupling agents by injecting a relatively small volume of diesel oil or other inert, neutral liquid flushing agent into the formation to clean the surfaces of the sand particles. This enhances the ability of the coupling agent to bond to the sand. The exact volume of flushing liquid which is injected will of course depend, among other things, on the thickness and porosity of the formation being treated but will usually be from .5 to 20 barrels per vertical foot of perforated formation interval to be treated; there is, however, no criticality to the amount of preflush used.

Following the initial cleansing operation, a composition, including coupling agent of the type described and a suitable carrier, is introduced into the formation. The carrier will vary considerably, according to the type of coupling agent utilized and the prevailing formation conditions, but in any case is characterized by being a solvent for the coupling agent and by being relatively inert with regard to the other constituents used in the process and to the formation.

A variety of compounds may be employed as a carrier for the coupling agent. For example, diesel fuel, water, crude oil, distillate, isopropanol etc., may be used, depending upon the economics and convenience of a given situation and the coupling agent employed. Usually, however, diesel fuel will be a preferred carrier.

Usually the coupling agent will be from about 0.005 percent to about 10 percent of the total composition, with a preferred range of from about 0.05 percent to about 1.0 percent.

When the methacrylato chromic chloride coupling agent is employed, the normally acid complex is preferably adjusted with a nitrogen-containing base such as ammonium hydroxide to an initial pH of at least about 4.0, but not greater than about 7.0. It has been experimentally determined that an aqueous solution containing about 20 parts by volume of an isopropanol methacrylato chromic chloride solution (6 percent chromium), about 100 parts by volume of water, and about 4.4 parts by volume of a 1 percent aqueous ammonia solution gives good results in water-saturated loose sand strata. When using γ-aminopropyltriethoxysilane and δ-aminobutylmethyldiethoxysilane as coupling agents, these compounds are usually made up from about 0.005 to about 10 percent aqueous or diesel oil solutions prior to injection into the formation. Generally, a preferred solution range is from about 0.05 to about 5 percent and an optimum range from about 0.05 to about 1 percent. As in the case of the total volume of liquid used to flush out the formation initially, the volume of coupling agent which is utilized will depend, among other factors, on the porosity, composition, and size of the formation being treated. Generally from about .2 to about 20 barrels of coupling agent solution per vertical foot will be used, although a preferred range is from about .5 to about 5 barrels.

After pumping the coupling agent into the formation, a second quantity of the inert, neutral flushing agent is usually injected into the formation to spread out and disperse the coupling agent. Generally about .5 to about 5 barrels per vertical foot of formation will be used for this purpose, although as much as 10 or more barrels or sometimes no overflush may be used.

Next follows the introduction of the consolidating resinous material, usually in a suitable solvent, into the formation. In general, this may be accomplished by any of the known and widely practiced techniques now in use. Also, although the preferred resinous material to be used for consolidation is a phenol-formaldehyde type, other resins of the thermosetting type, such as alkyd resins and acrylic resins, are suitable. As examples of such resins and methods of introducing them to incompetent formations, reference may be made to U.S. Pat. No. 2,378,817 issued to Wrightsman et al., U.S. Pat. No. 2,604,172 issued to Wrightsman, U.S. Pat. No. 2,823,753 issued to Henderson et al., U.S. Pat. No. 2,981,334 issued to Powell, and U.S. Pat. No. 2,476,015 issued to Wrightsman. In the case of the phenol-formaldehyde resinous materials, an unpolymerized, or preferably a partially polymerized, mixture of phenol and formaldehyde which includes a suitable catalyzing agent, such as an aqueous caustic solution, is pumped down the borehole and out into the formation. The amount of consolidating material used will depend on a variety of parameters, including well geometry, formation characteristics, etc. Ordinarily, the amounts used in the instant process will coincide with the amounts used in the standard phenol-formaldehyde process. Thus, generally, about .5 to about 15 barrels per vertical foot of perforated interval will be used, although a preferred range is from about .5 to about 5 barrels.

Immediately after the resinous composition is injected into the formation, the formation is again flushed with an inert, neutral material to remove excess resinous material and prevent the pores of the formation from becoming clogged. The amount of overflush may vary widely, depending upon among other things the amount of polymerization that has taken place in the resin when it is injected. Generally, for an unpolymerized resin, less than about one barrel per foot of perforated interval will be used, while in the case of a partially polymerized resin mixture from no overflush to 10 barrels per perforated foot may be used, although in the latter case the amount of overflush is not critical and substantially more may be used.

When the coupling agent is incorporated in the overflush, the ratio of coupling agent to carrier and the total amount of overflush material used are the same as the ratios and amounts utilized when the coupling agent is injected as a preflush. Similarly, when the coupling agent is added to the resin mixture before injection, the total amount of resin mixture used will be the same amount which would have been used had the coupling agent been injected separately. In this case, the ratio of coupling agent to resin mixture will be the same as the ratio of coupling agent to carrier when the latter mixture is injected prior to the resin. As will be obvious to one skilled in the art, several of the coupling agents listed herein may, when used in higher concentrations, be expected to accelerate polymerization rates beyond optimum limits. Consequently, before practicing the invention with the higher concentrations, it may be found advisable to conduct a series of reaction rate tests using standard laboratory techniques in order to determine the optimum ratio between coupling agent and resin mixture for a given situation.

Finally, the well is shut in, or at least flow is restricted substantially, so that the consolidating material will have an opportunity to set up to a hardened state. As will be appreciated by those skilled in the art, such setting-up time may range from about 12 to 48 hours, depending upon the resinous mixture employed and formation conditions.

As a preferred embodiment of the present invention, it has been discovered that the injection at the wellhead of a partially polymerized resin mixture gives results superior to those obtained when an unpolymerized resin mixture is used. As used herein and in the appended claims, the phrase "partially polymerized resin mixture" is used to indicate those mixtures wherein reaction or condensation has begun but wherein polymerization has not reached an end point. These mixtures consist essentially of one or more of the following classes of compounds or elements: monomers, the initial reaction or condensation product of the monomers, prepolymers, and the final polymerization product. Moreover, the term "polymerization" as used herein is intended to include condensation reactions as well as the more narrowly defined polymerization processes.

It has been found that, when a partially polymerized phenol-formaldehyde resin mixture is introduced at the wellhead, the amount of overflush used after the injection of the resin into the formation becomes less critical. For instance, when an unpolymerized resin is injected, the amount of later overflush must be controlled within narrow limits to maintain the advantages of the instant process. If too much overflush is used, the resin is washed from the critical portions of the formation with a resulting decline in crushing strength. When, however, the injected resin is partially polymerized, excess amounts of overflush may be used without this deleterious effect.

This phenomenon occurs over a wide range of degrees of partial polymerization, and it is believed that any significant amount of polymerization prior to injection at the wellhead will result in a decrease in the criticality of the amount of overflush later used. In practice, it is ordinarily preferred to allow polymerization to progress at least to the stage whereat the viscosity of the resin mixture is about 1.25 times the original viscosity of the mixture. The original viscosity will, of course, vary over a wide range, depending upon a variety of factors which will be obvious to one skilled in the art, not the least of which is the identity of the initial reactants or condensants. Generally, this range will vary from about 0.1 to about 10 poise, although under extreme conditions of temperature, etc., the initial viscosity may fall outside this range.

Beyond the minimum polymerization discussed above, resin mixtures wherein substantial polymerization has taken place may also be used, with a corresponding decrease in the criticality of the amount of overflush. The limiting factor in the amount of polymerization of which advantage may be taken appears to be the pumpability of the solution containing the partially polymerized resin mixture. Thus, so long as existing equipment is capable of injecting a solution containing the partially polymerized resin mixture into the formation, the upper limit on degree of allowable polymerization has not yet been reached. Generally, practical considerations preclude the use of a resin mixture wherein the partial polymerization has advanced to a point whereat the solution evinces a viscosity much above about 25 stokes.

Experience has indicated that substantially optimum conditions are reached when the partially polymerized resin mixture has polymerized to the point at which it is insoluble in diesel oil. At this point, the viscosity of the partially polymerized resin mixture is not such that it will place undue strain on the wellhead equipment, while at the same time relative large volumes of overflush may be subsequently used without washing significant amounts of the resin from the portion of the formation adjacent the well bore.

Aside from the optimum conditions mentioned above, a generally preferred range of degrees of polymerization is from the degree of polymerization at which the partially polymerized resin mixture becomes insoluble in diesel oil to the degree of polymerization which results in the solution containing the partially polymerized resin mixture having a viscosity of about 25 stokes.

The following examples will serve to illustrate methods of employing the invention. In many of these examples, there are a number of steps which are repeated several times; and for purposes of brevity, these steps will now be described in detail. Later they will be mentioned only by reference in the specific examples wherein the steps were carried out.

In each of the examples, sand cores were prepared using a Black Hawk "E" sand, which is a clean, white, siliceous sand having particles ranging in size from about 60 mesh to about 325 mesh. Generally, the average size of the particles is about 100 mesh. The cores were prepared by packing a quantity of loose Black Hawk "E" sand under water into a resilient sleeve. A small quantity of 20—40 mesh clean siliceous sand was placed in each end of the sleeve followed by a 60 mesh screen. Subsequently, apertured plugs were placed on each end of the sleeve to form an essentially cylindrical core.

The sand consolidation treatments which are reported in the examples were evaluated in the laboratory by treating the cores under simulated subsurface conditions. In simulating these conditions, a core was first placed in a pressure bomb which was in turn immersed in a constant temperature bath of about 160°F. A hydraulically simulated overburden pressure of about 750 p.s.i. was applied externally of the sleeve in which the sand sample was contained and, because of the resiliency of the sleeve, was transmitted substantially undiminished to the sand itself. In addition, provision was made for raising the temperature of test fluids to about 160°F. before they were flowed through the sand cores.

Prior to treatment of the cores or measurement of any core parameters, the cores were flushed with 10,000 to 20,000 cc. of No. 1 diesel fuel, hereinafter called "diesel oil," to obtain irreducible water saturation.

In those experiments where permeability was determined, it was determined by measuring the diesel oil flow rate and the pressure drop across the core. Data obtained from these two variables were used in determining permeability by mathematical relationships well known in the art.

In many of the following examples, reference will be made to a standard phenol-formaldehyde resin treatment. This standard treatment utilized a phenol-formaldehyde resin prepared substantially in accordance with the procedures outlined in examples 2 and 3 in U.S. Pat. No. 2,981,334 and was accomplished in the following way: About 100 cc. of a solution consisting of approximately 30 percent phenol-formaldehyde resin solids and approximately 70 percent ethanol was pushed through a core, together with approximately 0.9 cc. of a 25 percent aqueous NaOH solution by about 100 cc. of diesel oil. Following the flushing with the resin, the core was left in the constant temperature bath at 160°F. for from three to five days to allow the resin to harden and consolidate the sand core. After curing, the consolidated core was removed from the sleeve and cut into ⅞-inch lengths for further tests.

EXAMPLE 1

Four water-saturated core samples of Black Hawk "E" sand were prepared as described above; and two of the samples, A and B, were treated with the standard phenol-formaldehyde resin treatment. The remaining two samples, C and D, were flushed with 200 cc. of a 0.05 percent aqueous solution of γ-aminopropyltriethoxysilane coupling agent. Permeability was then determined, and 150 cc. of diesel oil was flushed through the cores. Subsequently, the cores were given a standard phenol-formaldehyde treatment. The results obtained are as follows:

| Core: | Initial permeability (Darcies) | Percent return permeability | Average crushing strength, after 5 days |
|---|---|---|---|
| A | 9.6 | 77 | 54 |
| B | 10.0 | 77 | 63 |
| C | 8.6 | 77 | 1,288 |
| D | 9.6 | 83 | 1,478 |

From the above results, it is at once apparent that there was a substantial increase in the crushing strength of the cores treated by a coupling agent. Moreover, it would appear that, when relatively small amounts of the coupling agent are passed through the cores, plugging is not a major problem.

EXAMPLE 2

Example 1 was repeated substantially except that methacrylate chromic chloride was substituted for the γ-aminopropyltriethoxysilane. The sand used in the cores had a slightly different size distribution. Results of permeability and compressive strength runs on these four cores were as follows:

| Core | Compressive strength, p.s.i. | Percent of retained permeability after treatment |
|---|---|---|
| Standard treated core: | | |
| A | 112 | 76 |
| B | 122 | 77 |
| Coupling agent treated core: | | |
| C | 898 | 74 |
| D | 823 | 68 |

The original permeabilities of all cores were the magnitude of 8—10 darcies. Thus, the maximum loss of permeability of 32 percent sustained by the second coupling agent treated core does not represent a serious or intolerable reduction in permeability. In fact, the employment of the coupling agents appears to cause only a slight additional loss of permeability when a normal amount of the coupling agent is flowed through the core.

EXAMPLE 3

An additional run was made to further demonstrate the effectiveness of the present technique for consolidating loose materials. Prior to the conducting of this experiment, a phenol-formaldehyde resin was prepared in the following manner: A first solution consisting of 252 grams of 37 percent formaldehyde in a water solvent, 195 grams of phenol, and 25 grams of a 50 percent sodium hydroxide solution in a water solvent was mixed together in a 2,000-ml., three-necked flask fitted with a stirrer, condenser, and thermometer. The solution was heated to 175°F. and held at this temperature for 1½ hours. At the expiration of this time, heat was removed from the flask, and the solution was allowed to cool to 107°F. When the solution reached this temperature, it was neutralized to a pH of about 4—6 with 27 cc. of a 32 percent aqueous HCl solution, whereupon the solution separated into two layers; the top layer was discarded, and the bottom layer was found to have a volume of about 265 cc. To the bottom layer was added 205 grams of resorcinol, and the resulting solution was diluted with an equal volume of ethanol.

A second solution was prepared by mixing together 279 grams of cresol, 267 grams of a 37 percent formaldehyde solution in a water solvent, 133 grams of paraformaldehyde, and 17.75 grams of a 50 percent aqueous sodium hydroxide solution. The cresol used consisted of 54 percent metacresol, 29 percent paracresol, and 17 percent phenol. After mixing, the ingredients were heated to 125°F., and the temperature was maintained at this level for 30 minutes. Subsequently, the solution was cooled to about 107°F. and neutralized with 15 percent aqueous HCl to a pH of about 4. At this time no layering was observed in the solution. Subsequently, 17.75 grams of sodium hydroxide were added; and the solution was again heated to and maintained at 125°F. for an additional 15 minutes, whereupon it separated into two layers. As in the preparation of the first solution, the top layer was discarded; and the lower layer, which was about 382 cc. in volume, was heated to 175°F. for about 1½ hours. The resulting mixture separated into two phases, and the upper phase was again discarded. The lower layer was diluted with an equal volume of ethanol.

Following the preparation of the two solutions, 33 cc. of the first solution and 33 cc. of the second solution were combined with 33 cc. of ethanol and 0.9 cc. of a 25 percent aqueous solution of sodium hydroxide. After these steps were taken, the resulting mixture was used in the standard phenol-formaldehyde resin treatment described previously. Results obtained from this experiment are designated Run A below.

For Run B, the same procedure was followed except that the core was given a preflush prior to the resin treatment with 4,000 cc. of a 0.2 percent solution of γ-aminopropyltriethoxysilane in 80 percent diesel oil and 20 percent isopropanol. The results of both of these runs are as follows:

| Run: | Average crushing strength, p.s.i. | Percent retained permeability |
|---|---|---|
| A | 87 | 87 |
| B | 2,733 | 61 |

It will be noted that the results obtained in this operation are in favorable agreement with results previously reported.

EXAMPLE 4

In order to demonstrate the feasibility of including the coupling agent directly in the resin mixture prior to injection of the mixture into the formation, two additional cores of Black Hawk "E" sand were prepared as described previously. Into each of the cores was then injected 100 cc. of a phenol-formaldehyde mixture. This mixture was substantially the same as that described previously in the discussion of the standard phenol-formaldehyde resin treatment. However, instead of using 0.9 cc. of a 25 percent aqueous NaOH solution, 1 cc. of γ-aminopropylethoxysilane was preblended with the resin mixture. After this treatment, the cores were cured for four days at 160°F. and were then found to have a retained permeability of about 85 percent and an average crushing strength of about 1,285 p.s.i.

The values obtained from this process compare favorably with those values obtained when the coupling agent was added to the core separately.

From the foregoing description of the invention, it will be appreciated that the described process provides certain marked improvements in methods currently used for consolidating incompetent subterranean formations. Although certain specific examples have been given, it is not intended that the invention be limited to or circumscribed by the specific details of material, proportions, or conditions herein specified, since such materials, proportions and conditions may be varied or modified according to individual preference without operating outside the broad principle underlying the invention. For example, instead of using phenol-formaldehyde as the resinous material to consolidate the formation or slurry with sand, other condensation products of water-soluble aldehydes and low molecular weight hydroxylaryl compounds may be used. Also a wide variety of the Werner complex-type compounds may be used as coupling agents as may numerous aminoorganosilanes. Selection of specific compositions and the quantity thereof to be used will, as has been indicated, depend upon the problems posed by the particular formation which is to be consolidated.

I claim:

1. The method of consolidating incompetent formations which comprises the steps of:
   a. injecting into the formation a coupling agent for chemically bonding a resinous composition to the particles of the formation said coupling agent comprising a multivalent transition metal complex in which the metal atom is coordinated with an acyclic carboxylic acido group; and
   b. injecting into the formation an organic, age-hardenable resinous composition which reacts with said coupling agent.

2. The method claimed in claim 1 wherein said resinous composition is partially polymerized.

3. The method claimed in claim 2 wherein said resinous composition comprises a phenol-formaldehyde resin mixture.

4. The method claimed in claim 3 wherein said resin mixture is insoluble in diesel oil.

5. In the method of treating an incompetent subterranean formation with an age-hardenable resinous composition, the improvement which comprises mixing said resinous composition with a coupling agent for chemically bonding the resinous composition to the formation prior to the step of introducing the resulting mixture to the formation, said coupling agent comprising a compound of the Werner complex-type in which the multivalent nuclear metal of the complex is selected from the group consisting of chromium, cobalt, nickel, and zinc and in which the acido group, which is coordinated with the metal atom of the complex, is selected from the group consisting of acrylate and substituted acrylate groups.

6. The method defined in claim 5 wherein the resinous composition comprises a partially polymerized resin mixture.

7. The method defined in claim 6 wherein the partially polymerized resin mixture is insoluble in diesel oil.

8. A method for sand consolidation which comprises (a) introducing into unconsolidated oil-bearing sand a water solution containing a compound of the Werner complex-type in which the multivalent nuclear metal of the complex is selected from the group consisting of chromium, cobalt, nickel, and zinc and in which the acido group, which is coordinated with the metal atom of the complex, is selected from the group consisting of acrylate and substituted acrylate groups; thereafter (b) introducing into said unconsolidated sand a mixture selected from the group consisting of (1) resin-forming liquids comprising a low molecular weight hydroxy aryl compound, a water-soluble aldehyde and a catalyst, and (2) a solution comprising low molecular weight hydroxy aryl water-soluble aldehyde resin solids and a catalyst; and (c) allowing the mixture to harden and bind the particles of sand together.

9. A method for sand consolidation which comprises (a) introducing into unconsolidated oil-bearing sand a water solution containing a compound of the Werner complex-type in which the multivalent nuclear metal of the complex is selected from the group consisting of chromium, cobalt, nickel, and zinc and in which the acido group, which is coordinated with the metal atom of the complex, is selected from the group consisting of acrylate and substituted acrylate groups; thereafter (b) introducing into said unconsolidated sand an organic age-hardenable resinous composition which reacts with said Werner complex; and (c) allowing the resinous composition to harden and bind the particles of sand together.

10. The method of consolidating incompetent formations which comprises the steps of:
   a. injecting into the formation a coupling agent comprising methacrylate chromic chloride for chemically bonding a resinous composition to the particles of the formation; and
   b. injecting into the formation an organic, age-hardenable partially polymerized resinous composition which reacts with said coupling agent.

11. The method of consolidating an incompetent formation which comprises:
   a. flushing liquid into the formation to cleanse the formation particles;
   b. injecting into the formation a coupling agent for chemically bonding a resinous consolidating composition to the particles of the formation, said coupling agent comprising a compound of the Werner complex-type in which the multivalent nuclear metal of the complex is selected from the group consisting of chromium, cobalt, nickel, and zinc and in which the acido group, which is coordinated with the metal atom of the complex, is selected from the group consisting of acrylate and substituted acrylate groups;
   c. flushing liquid into the formation to remove excess coupling agent from the formation;
   d. injecting into the formation a thermosetting resinous composition which chemically reacts with said coupling agent;
   e. removing the excess of the resinous composition from the formation; and
   f. maintaining a static condition within the formation to permit the resinous composition to set up to a hardened state.

12. The method claimed in claim 11 wherein said resinous composition is a partially polymerized resin mixture.

13. The method claimed in claim 11 wherein the excess resinous composition is removed from the formation by flushing an inert, neutral liquid into the formation.

14. The method claimed in claim 11 wherein said thermosetting resinous composition comprises a water-soluble aldehyde and a low molecular weight hydroxyaryl.

15. The method claimed in claim 11 wherein said coupling agent is methacrylato chromic chloride and said resinous composition comprises a phenol-formaldehyde resin.

PO-1050
(5/69)

UNITED STATES PATENT OFFICE
CERTIFICATE OF CORRECTION

Patent No. 3,536,137          Dated October 27, 1970

Inventor(s) Herbert C. Walther

It is certified that error appears in the above-identified patent and that said Letters Patent are hereby corrected as shown below:

Column 6, line 54 deleted should read -- 6. 8-hydroxyquinolins and transition metal ions.

Signed and sealed this 18th day of May 1971.

(SEAL)
Attest:

EDWARD M. FLETCHER, JR.
Attesting Officer

WILLIAM E. SCHUYLER, JR.
Commissioner of Patents